US011838262B1

(12) United States Patent
Kangas et al.

(10) Patent No.: US 11,838,262 B1
(45) Date of Patent: Dec. 5, 2023

(54) DISCOVERY OF FQDN FOR TARGET WEBSITE

(71) Applicant: Cujo LLC, Walnut, CA (US)

(72) Inventors: Santeri Kangas, Kirkkonummi (FI); Kimmo Kasslin, Espoo (FI); Leonardas Marozas, Vilnius (LT); Filip Savin, Vilnius (LT)

(73) Assignee: Cujo LLC, Covina, CA (US)

( * ) Notice: Subject to any disclaimer, the term of this patent is extended or adjusted under 35 U.S.C. 154(b) by 0 days.

(21) Appl. No.: 18/072,280

(22) Filed: Nov. 30, 2022

(51) Int. Cl.
| | | |
|---|---|---|
| *H04L 29/12* | (2006.01) | |
| *H04L 61/4511* | (2022.01) | |
| *H04L 61/09* | (2022.01) | |
| *H04L 9/40* | (2022.01) | |
| *H04L 67/02* | (2022.01) | |
| *G06F 15/16* | (2006.01) | |
| *G06F 16/901* | (2019.01) | |
| *H04L 101/618* | (2022.01) | |

(52) U.S. Cl.
CPC .......... *H04L 61/4511* (2022.05); *H04L 61/09* (2022.05); *H04L 63/14* (2013.01); *H04L 67/02* (2013.01); *H04L 2101/618* (2022.05)

(58) Field of Classification Search
CPC ..... H04L 61/4511; H04L 61/09; H04L 67/02; H04L 2101/618; G06F 15/16; G06F 16/901
USPC ........................................................ 709/245
See application file for complete search history.

(56) References Cited

U.S. PATENT DOCUMENTS

| | | | |
|---|---|---|---|
| 7,630,359 B1 * | 12/2009 | Cherchali | ............... H04L 12/66 370/467 |
| 9,270,684 B2 | 2/2016 | Ashley et al. | |
| 10,862,907 B1 * | 12/2020 | Pon | ........................ G06F 16/955 |
| 2009/0052434 A1 * | 2/2009 | Jackson | .................. H04L 12/66 370/352 |

(Continued)

FOREIGN PATENT DOCUMENTS

EP 3941019 A1 1/2022

OTHER PUBLICATIONS

Extended European Search Report for European Patent Application No. 22210694.0, dated May 23, 2023, 7 pages.

(Continued)

*Primary Examiner* — Jude Jean Gilles
(74) *Attorney, Agent, or Firm* — Dority & Manning, P.A.

(57) ABSTRACT

A first data communication of a first connected device related to a first target website is intercepted. The first data communication identifies the first target website by a first fully qualified domain name (FQDN), and the first FQDN is mapped to a first Internet protocol (IP) address. A pair of the first FQDN and the first IP address is determined. A second data communication of a second connected device related to a second target website is intercepted. The second data communication comprises a second encrypted FQDN and a second IP address of the second target website. The second IP address is determined to be equal to the first IP address. A cybersecurity reputation of the second target website is retrieved based on the first FQDN. In response to determining that the reputation matches a predetermined alarm condition, a cybersecurity operation is enforced for the second data communication.

20 Claims, 7 Drawing Sheets

(56) References Cited

U.S. PATENT DOCUMENTS

2016/0285628 A1* 9/2016 Carrer ............... H04L 9/321
2023/0164119 A1* 5/2023 Kasslin .............. H04L 63/166
726/12

OTHER PUBLICATIONS

Hoang, Nguyen Phong, et al., "Assessing the Privacy Benefits of Domain Name Encryption," In Proceedings of the 15th ACM Asia Conference on Computer and Communications Security (ASIA CCS '20), Oct. 5-9, 2020, arXiv:1911.00563 [cs.CR], 15 pages.

* cited by examiner

DISCOVERY OF FQDN FOR TARGET WEBSITE

BACKGROUND

Connected devices, including user devices and Internet of Things (IoT) devices, use websites for various operations, such as browsing webpages of a website, uploading sensor data to the website, or downloading a software update from the website. Each target website is specified by a fully qualified domain name (FQDN), also known as an absolute domain name. The FQDN is a domain name, which specifies the exact location of the website in the tree hierarchy of the domain name system (DNS). As the connected device is starting a connection establishment to the target website, a cybersecurity reputation of the website is checked so that if needed, an appropriate cybersecurity operation may be executed to protect the connected device, and the communication network in general, from a cybercrime threat. The cybersecurity protects connected devices from theft, damage and disruption, for example. However, a user privacy may complicate the reputation check. For example, the FQDN of the website may be encrypted in the data communication of the connected device, so that it becomes difficult or impossible to perform the reputation check. Consequently, further sophistication is desirable to balance cybersecurity vs. privacy.

SUMMARY

According to an aspect of the disclosure, there is provided subject matter of independent claims.

One or more examples of implementations are set forth in more detail in the accompanying drawings and the detailed description.

BRIEF DESCRIPTION OF DRAWINGS

Some examples will now be described with reference to the accompanying drawings, in which.

DETAILED DESCRIPTION

Figure 1A:
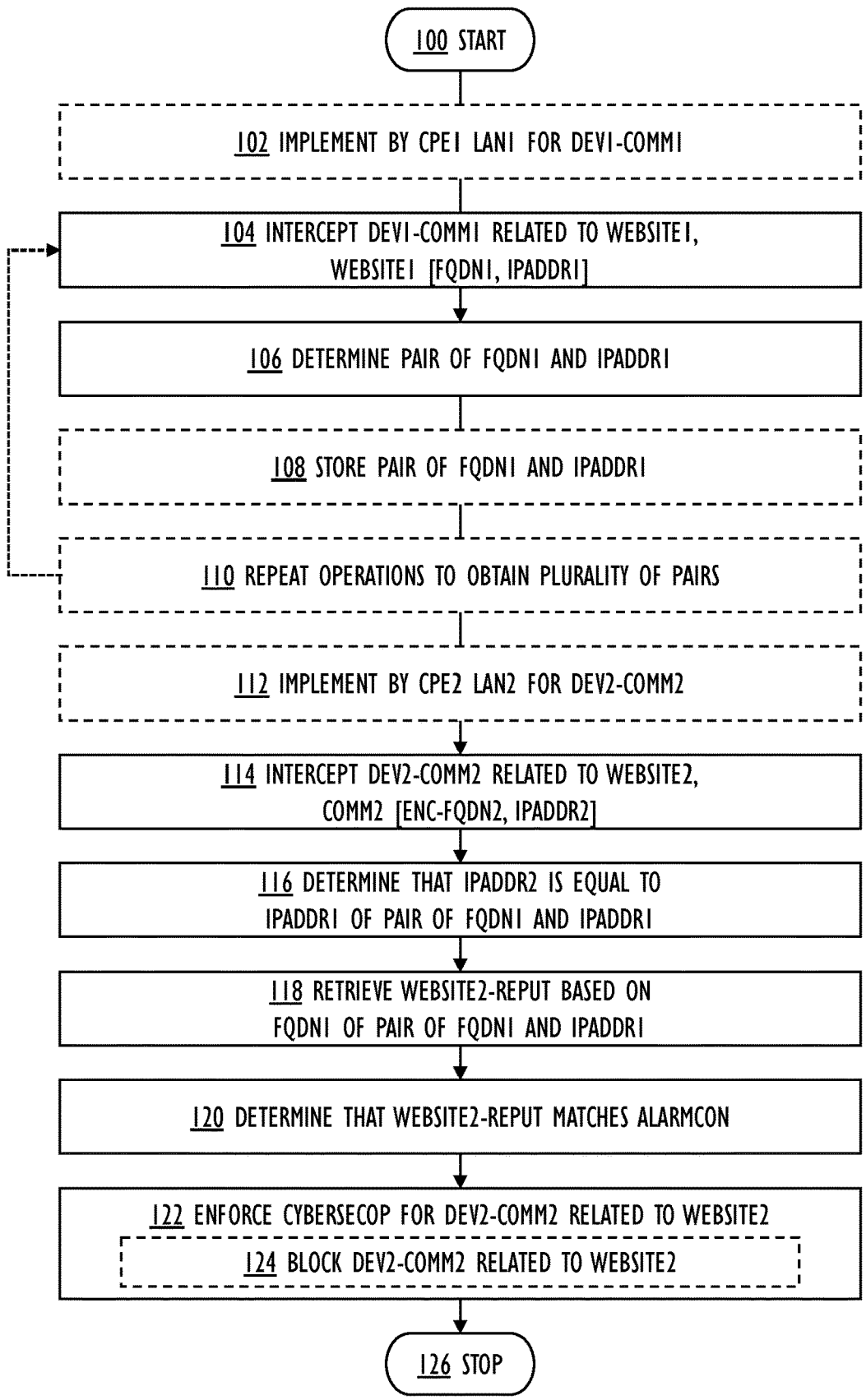
FIG. 1A, FIG. 1B, and FIG. 1C are flowcharts illustrating examples of a method.

The following description discloses examples. Although the specification may refer to "an" example in several locations, this does not necessarily mean that each such reference is to the same example(s), or that the feature only applies to a single example. Single features of different examples may also be combined to provide other examples. Words "comprising" and "including" should be understood as not limiting the described examples to consist of only those features that have been mentioned as such examples may contain also features and structures that have not been specifically mentioned. The examples and features, if any, disclosed in the following description that do not fall under the scope of the independent claims should be interpreted as examples useful for understanding various examples and implementations of the invention.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

The connected devices use websites for various operations. A user of the user device may use a browser to browse webpages of a website, to view media content provided on the webpages, for example. The IoT device may upload sensor data gathered by one or more sensors onboard the IoT device to the website, for example. The user device and the IoT device may download a software update from the website, for example. Numerous other well-known operations related to the websites may also be performed by the connected device.

Each target website is specified by the FQDN. The FQDN is a domain name, which specifies the exact location of the website in the tree hierarchy of the DNS. The FQDN is read from right to left:

the root zone is represented by a full stop (period), which is usually not visible in an address line of the web browser;

under the root zone is the top level domain (TLD); and under these are recursive subdomains (sometimes called a second level subdomain, a third level subdomain, etc.).

For example, the FQDN of the target website may be patent.somehost.exampledomain.com., wherein the root zone is ".", the top level domain is "com", a (second level) subdomain "exampledomain", a (third level) subdomain "somehost" and a (fourth level) subdomain "patent". In this example, the third level subdomain "somehost" may be called a hostname, and the combination of the top level domain and the second level subdomain "exampledomain.com" may be called a domain.

A cybersecurity reputation of the target website may be tied to the FQDN of the target website. For example, the reputation may be maintained for the FQDN "somehost.exampledomain.com." including the hostname. Or, in a more general way, the cybersecurity reputation may be maintained for the FQDN "exampledomain.com.", specifying the domain, whereby it defines the reputations for all its subdomains, such as "patent.somehost.exampledomain.com.",
"trademark.somehost.exampledomain.com.",
"www.exampledomain.com.",
etc.

Increasing privacy requirements for the connected devices complicate and even make impossible to find out the FQDN from the data communication of the connected device related to the target website. This is because the FQDN may be encrypted.

Figure 1B:
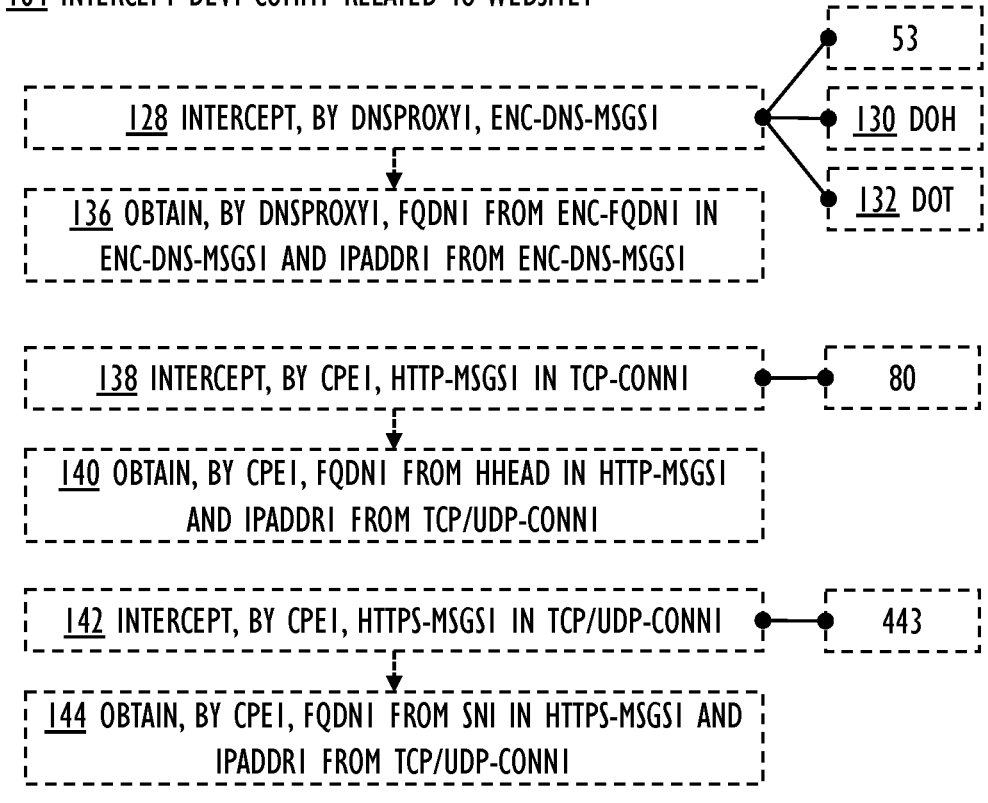
Figure 1C:
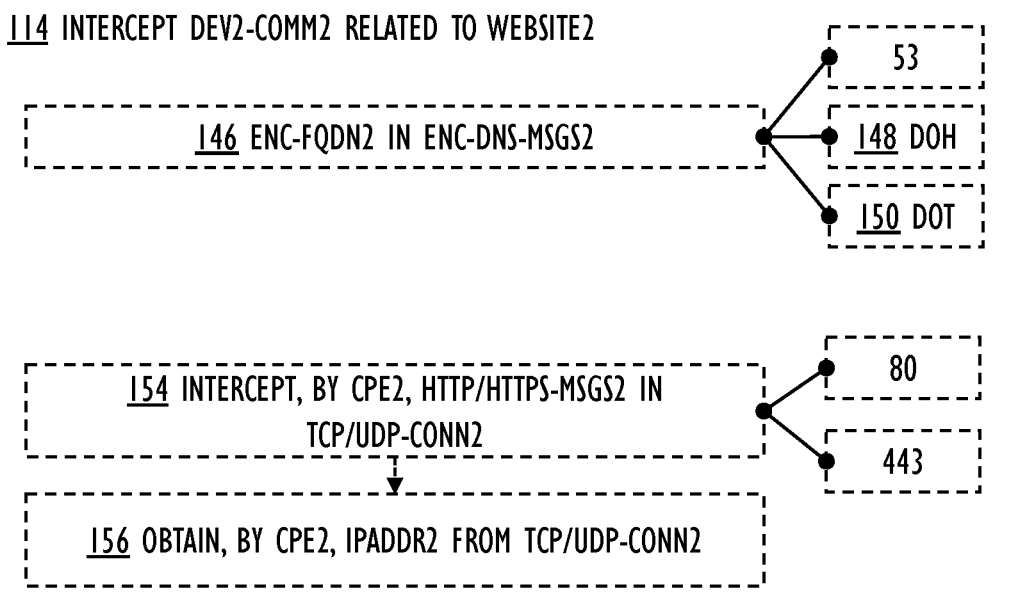

FIG. 1A, FIG. 1B, and FIG. 1C illustrate a method.

Figure 2:
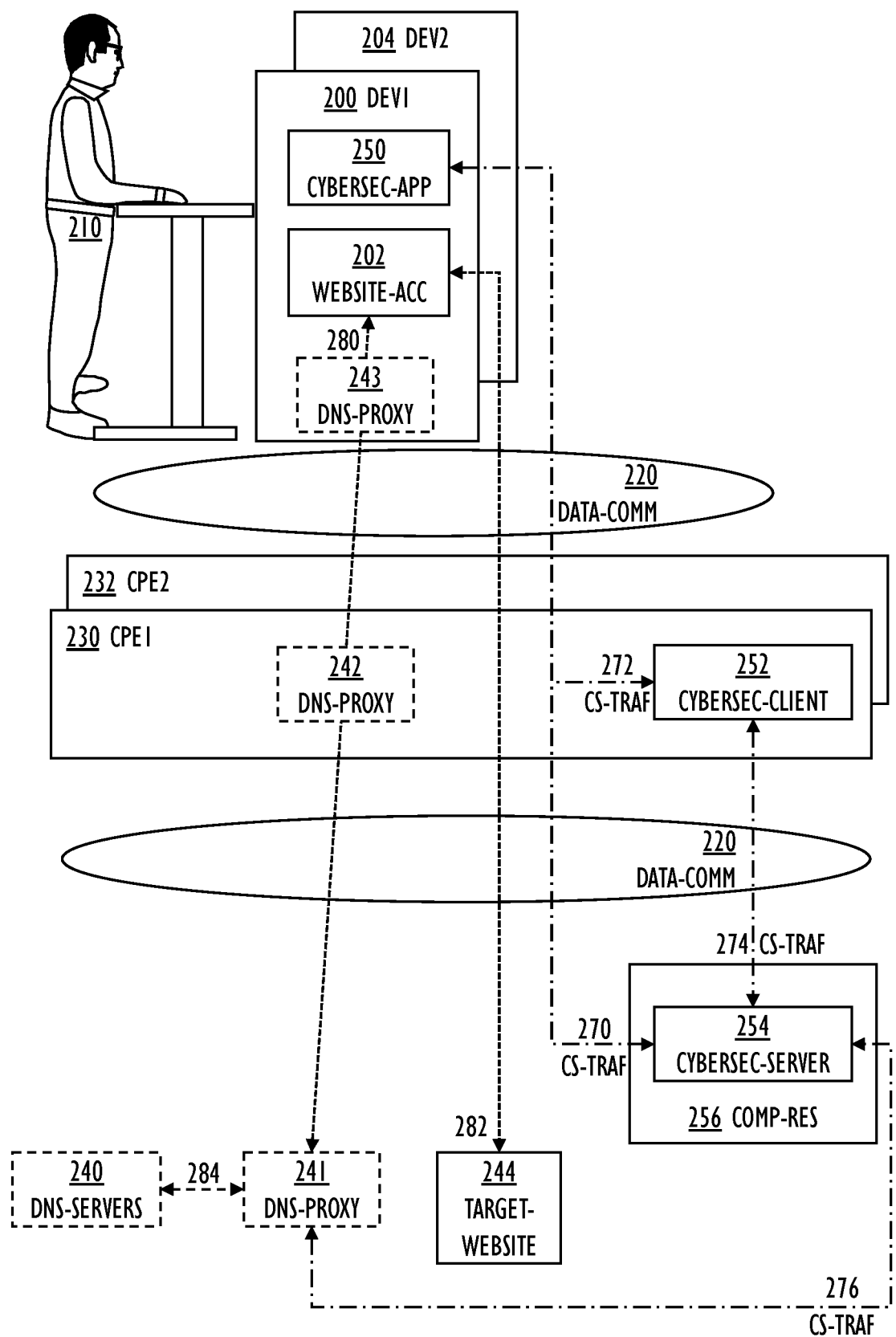
FIG. 2 is a block diagram illustrating an example implementation environment for the method.

FIG. 2 illustrates an example implementation environment for the method. The method may be a computer-implemented method.

Figure 3:
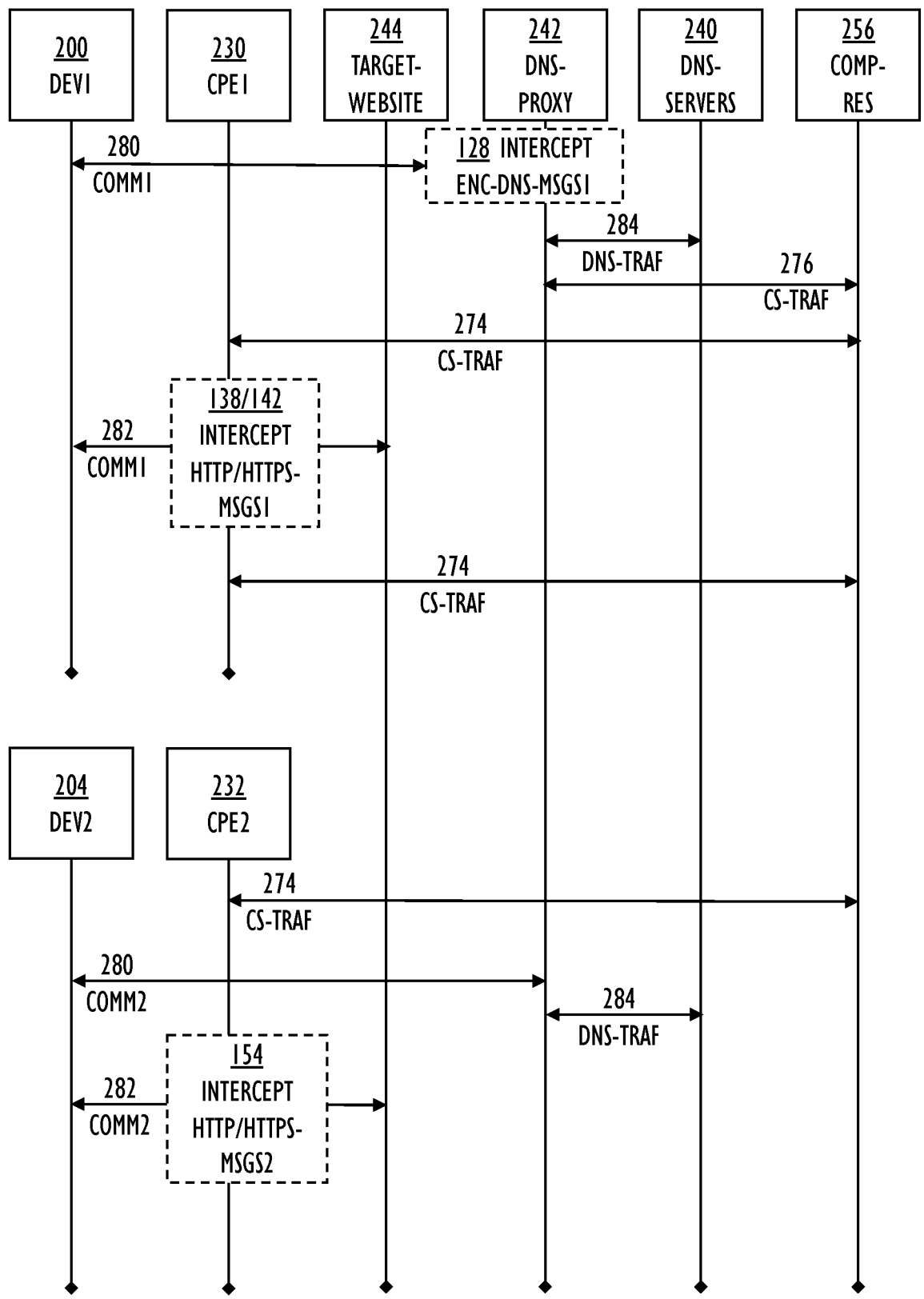
FIG. 3 is a sequence chart illustrating communication between various actors of the method.

FIG. 3 illustrates communication between various actors of the method.

The method performs discovery of the FQDN for the target websites 244 by first connected devices 200 so that it may subsequently be used for cybersecurity operations of second connected devices 204.

The method starts in 100 and ends in 126. The method may run in principle endlessly, or on demand.

The operations are not strictly in chronological order in FIG. 1A, FIG. 1B, and FIG. 1C, i.e., no special order of operations is required, except where necessary due to the logical requirements for the processing order. In such a case, the synchronization between operations may either be explicitly indicated, or it may be understood implicitly by the skilled person. If no specific synchronization is required, some of the operations may be performed simultaneously or in an order differing from the illustrated order. Other operations may also be executed between the described operations or within the described operations, and other data besides the illustrated data may be exchanged between the operations.

The connected device 200 is configured to execute a website access application 202, such as web user interface application (a web browser, for example), or a stand-alone application (a mobile app, for example), and as a result, data communication 220 is caused. The website access application 202 may automatically cause the data communication 220, or, alternatively, as a result of an action by the user 210 through user interface controls of the website access application 202. The data communication 220 may comprise data communication 280 between the connected device 200 and a DNS proxy server 241, 242, 243 and data communication 282 between the connected device 200 and the accessed website 244.

Note that FIG. 2 illustrates a single first connected device 200 and a single second connected device 204, but in real life the number of connected devices 200, 204 may be very high. A single network service provider, for example, may serve millions of connected devices 200, 204, or even more. Each first connected device 200 may transfer (transmit and receive) the data communication 220 via a first local area network implemented 102 by a first customer-premises equipment (CPE) 230. Each second connected device 204 may transfer the data communication 220 via a second local area network implemented 112 by a second CPE 232. Each CPE 230, 232 may serve a plurality of connected devices 200, 204.

A first data communication 220 of the first connected device 200 related to a first target website 244 is intercepted 104. The first data communication 220 identifies the first target website 244 by a first FQDN, and the first FQDN is mapped to a first Internet protocol (IP) address. Next, a pair of the first FQDN and the first IP address of the first target website 244 is determined 106. The pair may be determined 106 so that the first FQDN and the first IP address are mapped to each other, by placing them into a single data structure, for example, so that the mapping relationship may be maintained for later use. The pair of the first FQDN and the first IP address may be stored 108 in an appropriate data storage, such as a data structure (like a table) or a database.

As used herein, the term "intercepting" 104 refers to user-approved lawful interception or monitoring of the data communication 220 with a purpose and goal of increasing cybersecurity related to the connected device 200, 204 and its operating environment. As the data communication 220 is intercepted 104, the data communication 220 is accessed and collected between the transmitting device and the receiving device. The data communication 220 may be intercepted 104 even if the message or data packet in the data communication 220 is addressed to the receiving device. The intercepting 104 may be performed in the network, or at some network element, such as at a CPE (explained later), or at the receiving device, such as at a DNS proxy server (explained later). The intercepting may be implemented so that the data communication 220 is passively monitored, i.e., the data communication 220 is not affected by the intercepting. Alternatively, if needed, the intercepting may include a seizing a part of the data communication 220, i.e., the data communication 220 is actively influenced so that a connection and/or requests and/or responses are blocked until it may be decided whether a cybersecurity action is required.

Figure 4:
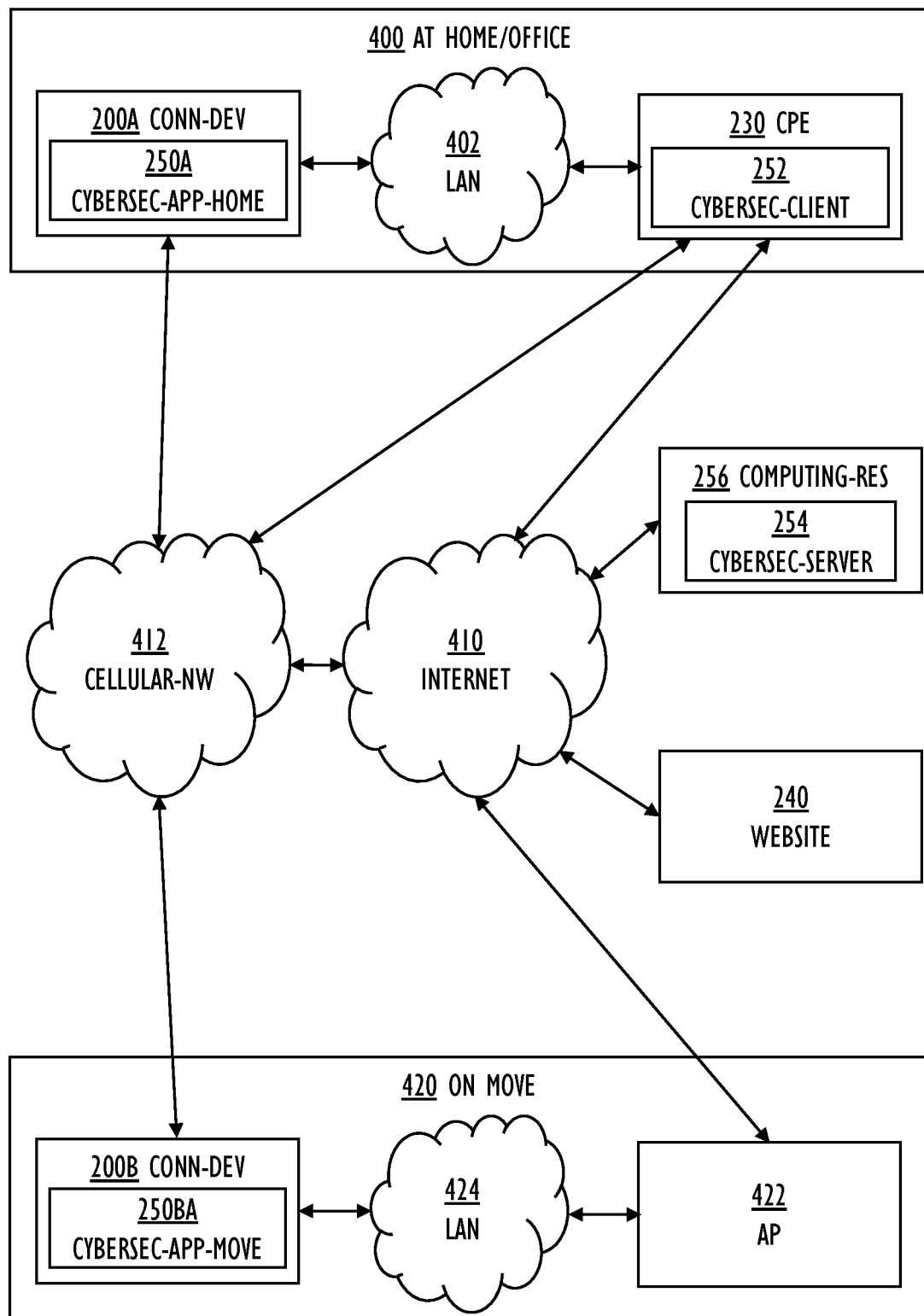
FIG. 4 is a block diagram illustrating an example operation environment.

Intercepting 104 the data communication 220 may be implemented so that the data communication 220 of the connected device 200, 204 over a communication network is intercepted 104. The intercepted 104 communication network may comprise a local area network 402 implemented by the customer-premises equipment (CPE) 230, 232 as shown in FIG. 4. The intercepting 104 may operate on DNS query and response messages 280 transmitted between the connected device 200, 204 and the DNS proxy server 241, 242, 243. The intercepting 104 may also operate on detecting a connection establishment 282 of the connected device 200, 204 to the target website 244. The intercepting 104 may also operate on detecting one or more of a hypertext transfer protocol (HTTP) request message, a HTTP response message, a HTTP secure (HTTPS) request message, and a HTTPS response message transmitted to and from the connected device 200, 204.

The IP address identifies (a network interface of) the host, and a location of the host on the Internet, whereby each IP packet containing an IP address of a source host and an IP address of a destination host, may be routed by a network path from the source host (or the connected device 200, 204) to the destination host (or the accessed target website 244). In this way, the first IP address identifies the first target website 244 (acting as the host).

In contrast to the FQDN being a text string, the IP address is a numerical label, defined as a 32-bit number (IPv4) or a 128-bit number (IPv6). A human-readable notation of the IPv4 address expresses the address as four consecutive decimal numbers (each representing 8 bits) separated by commas, the IPv4 address therefore ranging from 0.0.0.0 to 255.255.255.255. IPv6 has in the human-readable notation eight consecutive hexadecimal numbers (each hexadecimal number having four digits and representing 16 bits) separated by colons.

The IP address may be a static IP address, meaning that the address does not change, or a dynamic IP address, which is assigned to the host by the network when it connects, meaning that the address changes over time. The dynamic IP address may be assigned (and reassigned) by a dynamic host configuration protocol (DHCP) server, usually for a DHCP lease time (such as 24 hours, a fortnight, etc.).

As used herein, the term "connected device" 200 refers to a physical device with communication capabilities configured to communicate via the internet. The connected device 200 includes, but is not limited to, a user device, an IoT device, or another ubiquitous computing device.

The user device may be a terminal, a mobile device, a user equipment (UE), a radio terminal, a subscriber terminal, a smartphone, a mobile station, a mobile phone, a desktop computer, a portable computer, a laptop computer, a tablet computer, a smartwatch, smartglasses, a game terminal, or some other type of a wired or wireless mobile or stationary user communication device operating with or without a subscriber identification module (SIM) or an eSIM (embedded SIM).

The IoT device is provided with processing and communication technology and may also include one or more sensors and a user interface, and may be a stand-alone device, or an embedded device in a lighting fixture, thermostat, home security system, camera, smart lock, smart doorbell, smart refrigerator, or another household appliance, heating and cooling system, home and building automation system, vehicle, health and fitness monitor, remote health monitoring system, environmental sensor, IP camera, or network attached storage (NAS), etc.

As used herein, the term "data communication" 220 refers to the transmission and reception of (digital) data by the connected device 200. The data communication 220 is transferred over one or more communication channels (implemented by copper wires, optical fibers, and wireless communication using radio spectrum, for example) between the connected device 200 and other network nodes. A communication protocol may be used to transport payload data in packets. In a connection-oriented data communication 220, a connection needs to be established for transferring the payload data. In a connectionless data communication 220, the payload data is transferred over different paths with an independent routing.

The first connected device 200 may create a first connection 282 using a packet protocol for its website access application 202 to the first target website 244.

The packet protocols include, but are not limited to, TCP/IP (Transmission Control Protocol/Internet Protocol), UDP/IP (User Datagram Protocol/Internet Protocol), and QUIC, which establishes a multiplexed transport on top of the UDP.

Various HTTP/HTTPS (Hypertext Transfer Protocol/Hypertext Transfer Protocol Secure) requests may then be transferred in the connection 282, (using TCP streams or UDP datagrams, for example). Note that the term "connection" is used here for both TCP/IP and UDP/IP, although strictly speaking, the connection only exists in the connection-oriented TCP/IP, whereas in the connectionless UDP/IP messages are used for the "connection".

In the Internet protocol suite, the connection 282 is operated in a link layer, an internet layer, and a transport layer, and the requests transmitted in the connection 282 are operated in an application layer.

Before the connection 282 is made, the first connected device 200 needs to know the IP address of the first target website 244 as it only knows the first FQDN of the first target website 244. This may be implemented with a procedure called domain name resolution or DNS resolution. The DNS resolution translates the FQDN of the website 244 to an IP address of the website 244. As explained earlier, the FQDN may be written by a user 210 on an address line in the browser 202 as a part of the uniform resource locator (URL) of the website. The URL may look like this, for example:

https://patent.somehost.exampledomain.com/main

The website 244 may have both IPv4 and IPv6 addresses, and the DNS resolution may return both of them, the IPv4 address in a DNS A record, and the IPv6 in a DNS AAAA record.

The DNS proxy server (sometimes also known as a DNS resolver, or a recursive resolver) is a server configured to receive DNS queries from web browsers and other applications). The DNS proxy server receives the FQDN, and it is responsible for finding out the corresponding IP address. One FQDN may be mapped to many IP addresses, and, vice versa, one IP address may be mapped to many FQDNs. As shown in FIG. 2, the DNS proxy server may be located in different physical locations: a DNS proxy server 243 may be located in the connected device 200, a DNS proxy server 242 may be located in the CPE 230, or the DNS proxy server 241 may be located somewhere in the network and be accessible through the data communication 220. Note also that that DNS proxy servers 242, 243 may also exist simultaneously: if the DNS proxy server 243 in the connected device 200 is not able to resolve the FQDN, the DNS proxy server 242 in the CPE 230 may be queried. The encrypted DNS query and response messages 280 need to be accessed from the trusted DNS proxy server 241, 242, 243.

For example, the user types the above-mentioned example URL in the address line of the web browser 202 to load the "main"-webpage from the website 244. If a local DNS cache of the DNS proxy server 243 in the first connected device 200 has the corresponding IP address, the DNS is resolved immediately. The local DNS cache may be implemented so that DNS records of visited websites 244 are stored (for a duration of a time to live, TTL, value of each DNS record). If the local DNS cache does not contain the needed IP address, a DNS resolution query procedure is needed. The DNS resolution query procedure may be implemented so that the first connected device 200 transmits a DNS query message 280 containing the FQDN to the DNS proxy server 242, 241. The DNS proxy server 242, 241 then responds with a DNS response message 280 containing the FQDN and the (resolved) IP address of the website (possibly both IPv4 and IPv6). The DNS proxy server 242, 241 may be maintained by a network service provider (NSP). The DNS proxy server 241, 242 may also keep a DNS cache with DNS records of domain names, which a plurality of different first connected devices 200 have accessed. If the DNS proxy server 241, 242 does not have the needed IP address in the DNS cache, a series of interactive DNS queries 284 with DNS servers 240 is needed so that the DNS proxy server 241, 242 may finally respond with a completed DNS response message containing the FQDN and the resolved IP address.

Intercepting 104 the first data communication 220 of the first connected device 200 related to the first target website 244 may thus be implemented so that encrypted DNS query and response messages 280 related to the first target website 244 are intercepted 128 by the DNS proxy server 242, and the first FQDN is obtained 136 by the DNS proxy server 242 from an encrypted FQDN in the encrypted DNS query and response messages 280, and the first IP address is obtained 136 by the DNS proxy server 242 from the encrypted DNS query and response messages 280. The DNS query and response messages 280 may use a TCP or UDP port number 53 (a general port used by the DNS). If the DNS query and response messages 280 are communicated with the DNS proxy server 243 on the first connected device 200, the interception 104 of the first data communication 220 may be performed internally within the first connected device 200.

The encryption of the DNS query and response messages 280 increases data privacy and security of the user 210, because the encryption prevents eavesdropping and so-called man-in-the-middle attacks. The encrypted DNS query and response messages 280 may use a DNS over HTTPS (DoH) protocol 130. The DoH protocol performs the remote DNS resolution using the HTTPS protocol to encrypt the data. The DoH protocol is being standardized by the Internet Engineering Taskforce (IETF) in RFC 8484. The encrypted DNS query and responses messages 280 using the DoH protocol may use a TCP or UDP port number 443.

Alternatively, the encrypted DNS query and response messages 280 may use a DNS over transport layer security (DoT) protocol 132. The DoT protocol encrypts the data using the transport layer security (TLS) protocol. The IETF standard RFC 7858 describes the DoT protocol. The encrypted DNS query and responses messages 280 using the DoT protocol may use a TCP or UDP port number 853.

The encrypted DNS query and response messages 280 may use an encrypted client hello (ECH) extension of the TLS protocol. The TLS ECH extension enables DNS clients 200 to encrypt ClientHello messages 280, which are normally sent in cleartext, under a public key of the DNS proxy server 241, 242. Earlier iterations of this extension are also known as encrypted server name indication (ESNI). The ECH extension may be used to prohibit HTTPS connections to leak information in the TLS ClientHello message, especially to prohibit the hostname of the target website 244 being leaked.

In addition to, or as an alternative to, obtaining the IP address from the encrypted DNS query and response messages by the DNS proxy server 242, 241, the IP address may be obtained by the CPE 230, which implements the local area network 402 for the data communication 220 of the first connected device 200.

Intercepting 104 the first data communication 220 of the first connected device 200 related to the first target website 244 may thus be implemented so that HTTP request and response messages 282 in a TCP connection are intercepted 138 by the first CPE 230, which implements the first local area network 402 for the first data communication of the first connected device 200, and the first FQDN is obtained 140 by the first CPE 230 from a host header in the HTTP request and response messages 282, and the first IP address is obtained 140 by the first CPE from the TCP connection 282. The HTTP request and response messages may use a TCP port number 80.

Additionally, or alternatively, intercepting 104 the first data communication 220 of the first connected device 200 related to the first target website 244 may also be implemented so that HTTPS request and response messages in a TCP or UDP connection are intercepted 142 by the first CPE 230, and the first FQDN is obtained 144 by the first CPE 230 from an unencrypted server name indication (SNI) in the HTTPS request and response messages 282, and the first IP address is obtained by the first CPE 230 from the TCP or UDP connection 282. The HTTPS request and response messages may use a TCP or UDP port number 443.

Note that if the interception 104 of the first data communication 220 is made on the first user device 200 or on the first CPE 230 for both the DNS query and response messages 280 and the HTTP/HTTPS request and response messages 282, accuracy of the method may be increased as communications 280, 282 stem from the same first connected device 200 with certainty.

The operations of intercepting 104 the first data communication 220 of the first connected device 200 related to the first target website 244, and determining 106 the pair of the first FQDN and the first IP address (and possibly storing 108 the pair of the first FQDN and the first IP address) may be repeated 110 in order to store a plurality of pairs based on a plurality of first data communications 220 by a plurality of first connected devices 200 related to a plurality of first target websites 244. In this way, the plurality of CPEs 230, and/or the plurality of DNS proxy servers 242 (or 243, or 241) gather, or crowdsource, a vast number of pairs of the FQDN and the IP address. The pairs may then be used by a plurality of second connected devices 204 for finding out the requested FQDN even if the requested FQDN is encrypted. This is explained in the following for one second connected device 204. Note that the plurality of first connected devices 200 and the plurality of second connected devices 204 may be two totally distinct separate groups, or they be partly overlapping, or even such that the plurality of first connected devices 200 are a subgroup within the larger group of second connected devices 204. For example, the task of gathering the plurality of pairs may be dedicated to a group selected from among all connected devices served by a specific network service provider (by providing the CPEs 230, 232), and this group contains the first connected devices 200, but the stored pairs are then utilized by all connected devices of the specific network service provider, all connected devices containing both the first and second connected devices 200, 204.

The method may operate in real-time or near real-time so that numerous CPEs 230 and/or DNS proxy servers 242 (or 243, or 241) intercept 104 the data communication 220, and possibly also determine 106 and store 108 the pairs. Another alternative is that the interception 104 is performed by the CPEs 230 and/or DNS proxy servers 242 (or 243, or 241), but the pairs are determined 106 and stored 108 by one or more cybersecurity servers 254 running on computing resources 256. The method may also operate in a kind of a batch mode, i.e., the method is operated in response to a system request or a user request, or periodically, and the intercepted 104 data communication 220 may be from a certain time period, such as from 24 hours, one week, one month, three months, one year, or another time period, of which the information may be stored considering the storage space and cost requirements, for example. The time period may also be a sliding window, i.e., the information is stored from the present point in time backwards for a predetermined range (such as one week from the present date) with a first-in, first-out principle.

The CPEs 230, and/or the DNS proxy servers 242 (or 243, or 241), and/or the cybersecurity servers 254 may store raw data from the data communication 220 into a database. The database may be a data lake including the raw data, but also another type of data repository may be used. In addition to the raw data, or as an alternative, stored data regarding the data communication 220 may include refined data such as datasets, markers, connection requests, etc. A suitable network flow monitoring technology, such as Cisco® NetFlow or alternative network flow monitoring technologies may be used to intercept the data communication 220. NetFlow, or its equivalents collect IP network traffic as it enters or exits an interface (in the CPE 230, for example), and based on the collected traffic, a source and a destination of the network traffic (in the form of IP addresses) within the data communication 220 may be determined as the information.

The determined 106 and stored 108 pairs may then be used for a cybersecurity analysis of further data communication 220 by connected devices, here called second connected devices 204.

A second data communication 220 of a second connected device 204 related to a second target website 244 is intercepted 114. The second data communication 220 comprises a second encrypted FQDN of the second target website 244, and a second IP address of the second target website 244.

Next, it is determined 116 that the second IP address is equal to the first IP address of the pair of the first FQDN and the first IP address. The determination 116 that the second IP address is equal to the first IP address may be implemented so that all or some elements of the FQDN are compared with each other to confirm a match or a mismatch. Referring to the earlier example, the comparison may be declared a match if the FQDNs match with each other at the domain-level ("exampledomain.com"). For example, if the match is required at the domain-level, then the second IP address "host1.exampledomain.com" matches with the first IP address "host2.exampledomain.com", which makes sense as the reputation may be maintained at the domain-level. At the host-level there would be a mismatch as "host1" is not equal to "host2". In other words, the second IP address and the first IP address refer to the same website 244 identified by the FQDN.

A cybersecurity reputation of the second target website 244 is retrieved 118 based on the first FQDN of the pair.

The cybersecurity reputation of the second target website 244 may be defined with four categories, for example: malicious, trustworthy, suspicious, or unknown. If the reputation is malicious, an appropriate cybersecurity operation may be to block an access from the second connected device 204 to the second target website 244. But if the reputation is trustworthy, no cybersecurity operation is needed, and a network traffic from the second connected device 204 to the second target website 244 is allowed. The reputation may also be suspicious, which may necessitate an appropriate cybersecurity operation such as indicating the suspicious reputation of the website to the user of the second connected device 204, and inquiring from the user whether the access to the suspicious website should continue. If the reputation is unknown, the warning and user inquiry may be used, but in addition to this, the cybersecurity system triggers an analysis for determining the reputation for this previously unknown website. The reputation may be retrieved 118 from a cache or a database, which may be updated continuously by a supervised machine learning algorithm using a training set comprising malicious websites and trustworthy websites, for example.

In response to determining 120 that the cybersecurity reputation of the second target website 244 matches a predetermined alarm condition, a cybersecurity operation for the second data communication 220 of the second connected device 204 related to the second target website 244 is enforced 122.

The second data communication 220 may comprise the second encrypted FQDN in DNS query and response messages 146 related to the second target website 244. The DNS query and response messages may be encrypted in various ways, including, but not being limited to, the DoH protocol 148, the DoT protocol 150, and the ECH extension of the TLS protocol.

The second data communication 220 of the second connected device 204 related to the second target website 244 may be intercepted 114 so that HTTP or HTTPS request and response messages in a TCP or UDP connection are intercepted 154 by the second CPE 232, which implements the second local area network 402 for the second data communication 220 of the second connected device 204, and the second IP address is obtained 156 from the TCP or UDP connection by the second CPE 232.

Enforcing 122 the cybersecurity operation for the second data communication 220 of the second connected device 204 related to the second target website 244 may be implemented so that the second data communication 220 of the second connected device 204 related to the second target website 244 is blocked 124. The blocked 124 second data communication 220 may be focused on the HTTP or HTTPS request and response messages in the TCP or UDP connection, or also on the establishment of the TCP or UDP connection.

FIG. 4 illustrates an example operation environment. Two basic use cases are described: at home or office 400, and on the move 420.

The Internet 410 uses the Internet protocol suite including TCP/IP and UDP/IP to globally connect computer networks so that communication is enabled between connected devices 200A, 200B and various services provided typically by websites. The Internet 410 comprises public networks, private networks, academic networks, business networks, government networks, etc. interlinked with various networking technologies. The various services provide access to vast WWW (World Wide Web) resources, wherein webpages may be written with HTML (Hypertext Markup Language) or XML (Extensible Markup Language) and accessed by a browser or another application (such as a mobile app) running in the connected device 200A, 200B.

From the cybersecurity point of view, the Internet services may be divided between legitimate services and fraud services. Legitimate services operate according to moral and ethical standards enforced by law, police, or social pressure. Fraud services do not follow moral and ethical standards, and often perform criminal acts to disclose, steal or damage electronic data, software or hardware, or disrupt or misdirect services provided by the electronic data, software, and hardware. Fraud services may be fraudulent to the core, i.e., their only reason for existence is to perform malicious acts, but they may also be legitimate services as such, but being infected with malicious software so as to enable criminal acts. The criminal acts in general include, but are not limited to using a backdoor to bypass security mechanisms, make a denial-of-service attack (DoS), also as a distributed denial-of-service (DDoS), installing software worms or keylogger, eavesdropping a communication, phishing, spoofing, tampering, installing malware, etc. Note that different service providers, such as network service providers, network operators, cloud service operators, and cybersecurity operators, just to name a few, may operate and/or manage the various network nodes shown in FIG. 2.

Device identification, which may be defined as a capability to detect various apparatuses, such as the connected device 200A in the home/office LAN 402, also increases the cybersecurity. Traditionally, a Medium/Media Access Control protocol (MAC) address assigned by a device manufacturer and used in the data communication 220 (such as with wireless radio signals) within the LAN for the device identification. However, MAC randomization, which anonymizes and randomizes the MAC address to increase privacy, hinders the device identification based on the MAC address. Machine learning algorithms may use a number of other data items (such as device-specific unique radio interface characteristics, other current and historic unique identifiers related to the connected device 200A and its communication) to enable the device identification despite of the MAC randomization.

Numerous cellular networks (or mobile networks) 412 provide access to the Internet 410 for the connected devices 200A, 200B (both at home or office 400 and on the move 420) by providing a wireless link in a radio cell implemented by a base station (or a base transceiver station, an eNodeB (eNB), a gNodeB (gNB), or an access point, for example) implemented using a standard technology, including, but not being limited to a cellular radio network (GSM, GPRS, EGPRS, WCDMA, UMTS, 3GPP, IMT, LTE, LTE-A, 3G, 4G, 5G, 5G NR (5G New Radio), 6G, etc.), a wireless local area network (such as WLAN (Wireless Local Area Network), Wi-Fi, etc.), or a short-range radio network (such as Bluetooth or Bluetooth Low Energy (BLE), etc.). The use of the cellular radio network may necessitate use of a subscriber identity module (SIM), either as a physical chip, or as an embedded-SIM (eSIM), for example.

The CPE 230 is located at home or office 400 of the user 210 of the connected device 200A. The CPE 230 is stationary equipment connected to a telecommunication circuit of a carrier (such as a broadband service provider) at a demarcation point. The demarcation point may be defined as a point at which the public Internet 410 ends and connects with a Local Area Network (LAN) 402 at the home or office of the user of the connected device 200A. In this way, the CPE 230 acts as a network bridge.

The CPE 230 may include one or more functionalities of a router, a network switch, a residential gateway, a fixed mobile convergence product, a home networking adapter, an Internet access gateway, or another access product distributing the communication services locally in a residence or in an enterprise via a (typically wireless) LAN and thus enabling the user of the connected device 200A to access communication services of the broadband service provider, and the Internet 410. Note that the CPE 230 may also be implemented with wireless technology, such as a 5G CPE 230 configured to exchange a 5G cellular radio network signal with a base station operated by the broadband service provider, and generate a Wi-Fi (or WLAN) or wired signal to implement the LAN 402 to provide access for the connected device 200A. Furthermore, the 5G CPE 230 performs the conversion between the 5G cellular radio network signal and the Wi-Fi or wired signal.

On the move 420, the user of the connected device 200B may access the Internet 410 via the cellular networks 412, or via a local access point 422 implementing a local area network 424. The access point 422 may be provided with similar technology as used by the CPE 230. The access point 422 may be located at a bus station, at a train station, at an airport, at a hotel room, at a hotel lobby, at a conference or fair center, at a shopping mall, at a cafe, at a museum, at a rented apartment, or at another public or private location.

Figure 5A:
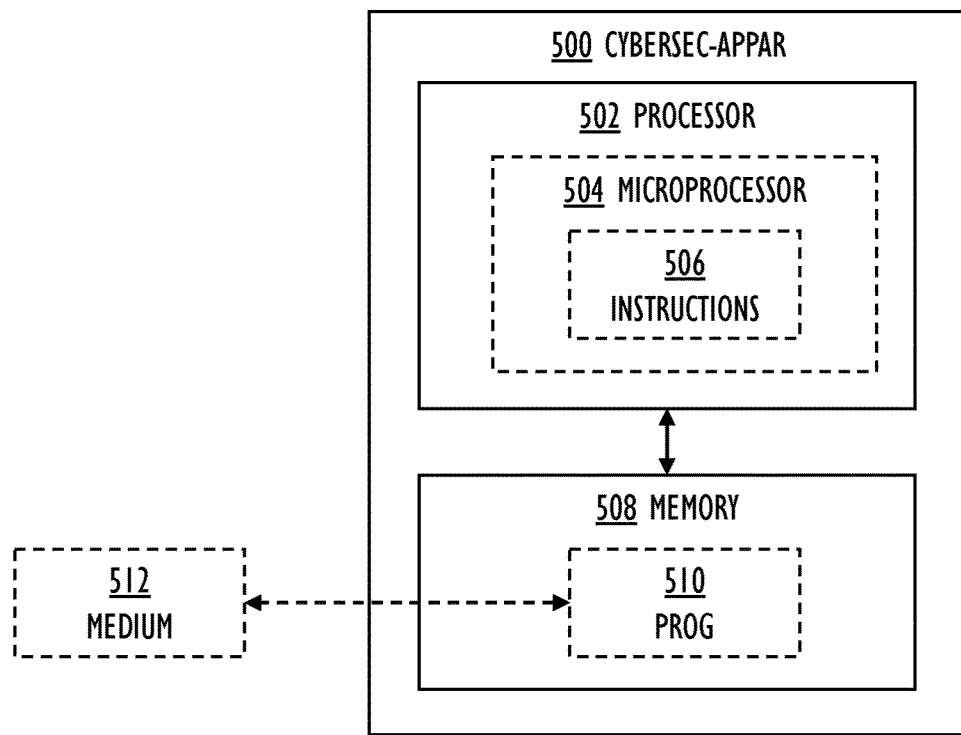
FIG. 5A and FIG. 5B are block diagrams illustrating examples of a cybersecurity apparatus.
Figure 5B:
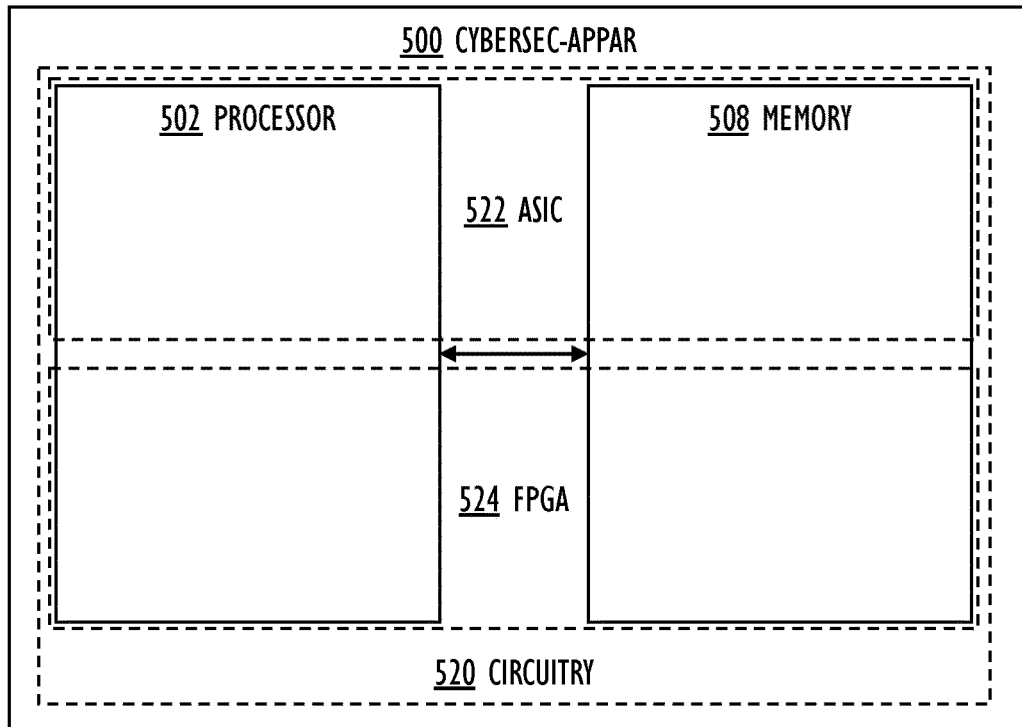

FIG. 5A and FIG. 5B illustrate examples of a cybersecurity apparatus 500 performing the operations of FIG. 1A, FIG. 1B, and FIG. 1C.

The method described with reference to FIG. 1A, FIG. 1B, and FIG. 1C may be implemented by the apparatus 500. The apparatus 500 may execute the operations defined in the method. The apparatus 500 may implement an algorithm, which includes at least the operations of the method, but may optionally include other operations related to the cybersecurity in general.

The apparatus 500 comprises one or more memories 508, and one or more processors 502 coupled to the one or more memories 508 configured to execute the operations described in FIG. 1A, FIG. 1B, and FIG. 1C.

The term "processor" 502 refers to a device that is capable of processing data. The term "memory" 508 refers to a device that is capable of storing data run-time (=working memory) or permanently (=non-volatile memory).

As shown in FIG. 5A, the one or more processors 502 may be implemented as one or more microprocessors 504, which are configured to execute instructions 506 of a computer program 510 stored on the one or memories 508. The microprocessor 504 implements functions of a central processing unit (CPU) on an integrated circuit. The CPU is a logic machine executing the instructions 506 of the computer program 510. The CPU may comprise a set of registers, an arithmetic logic unit (ALU), and a control unit (CU). The control unit is controlled by a sequence of the instructions 506 transferred to the CPU from the (working) memory 508. The control unit may contain a number of microinstructions for basic operations. The implementation of the microinstructions may vary, depending on the CPU design. The one or more microprocessors 504 may be implemented as cores of a single processor and/or as separate processors. Note that the term "microprocessor" is considered as a general term including, but not being limited to a digital signal processor (DSP), a digital signal controller, a graphics processing unit, a system on a chip, a microcontroller, a special-purpose computer chip, and other computing architectures employing at least partly microprocessor technology. The memory 508 comprising the working memory and the non-volatile memory may be implemented by a random-access memory (RAM), dynamic RAM (DRAM), static RAM (SRAM), a flash memory, a solid-state drive (SSD), PROM (programmable read-only memory), a suitable semiconductor, or any other means of implementing an electrical computer memory.

The computer program ("software") 510 may be written ("coded") by a suitable programming language, and the resulting executable code may be stored in the memory 508 and executed by the one or more microprocessors 504.

The computer program 510 implements the method/algorithm. The computer program 510 may be coded using a programming language, which may be a high-level programming language, such as Go, Java, Python, C, or C++, or with a low-level programming language, such as an assembler or a machine language. The computer program 510 may be in source code form, object code form, executable file, or in some intermediate form, but for use in the one or more microprocessors 504 it is in an executable form as an application. There are many ways to structure the computer program 510: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program 510 for performing a wide variety of standard operations. In addition, an operating system (such as a general-purpose operating system) may provide the computer program 510 with system services.

As shown in FIG. 5A, a computer-readable medium 512 may store the computer program 510, which, when executed by the apparatus 500 (the computer program 510 may first be loaded into the one or more microprocessors 504 as the instructions 506 and then executed by one or more microprocessors 504), causes the apparatus 500 (or the one or more microprocessors 504) to carry out the method/algorithm. The computer-readable medium 512 may be implemented as a non-transitory computer-readable storage medium, a computer-readable storage medium, a computer memory, a computer-readable data carrier (such as an electrical carrier signal), a data carrier signal (such as a wired or wireless telecommunications signal), or another software distribution medium capable of carrying the computer program 510 to the one or memories 508 of the apparatus 500. In some jurisdictions, depending on the legislation and the patent practice, the computer-readable medium 512 may not be the wired or wireless telecommunications signal.

As shown in FIG. 5B, the one or more processors 502 and the one or more memories 508 may be implemented by a circuitry 520. A non-exhaustive list of implementation techniques for the circuitry 520 includes, but is not limited to application-specific integrated circuits (ASIC) 522, field-programmable gate arrays (FPGA) 524, application-specific standard products (ASSP), standard integrated circuits, logic components, and other electronics structures employing custom-made or standard electronic circuits.

Note that in modern computing environments a hybrid implementation employing both the microprocessor technology of FIG. 5A and the custom or standard circuitry of FIG. 5B is feasible.

Functionality of the apparatus 500, including the capability to carry out the method/algorithm, may be implemented in a centralized fashion by a stand-alone single physical unit, or alternatively in a distributed fashion using more than one communicatively coupled physical units. The physical unit may be a computer, or another type of a general-purpose off-the-shelf computing device, as opposed to a purpose-build proprietary equipment, whereby research and development costs will be lower as only the special-purpose software (and necessarily not the hardware) needs to be designed, implemented, tested, and produced. However, if highly optimized performance is required, the physical unit may be implemented with proprietary or standard circuitry as described earlier.

As shown in FIG. 2, the cybersecurity apparatus 500 may comprise various distributed actors communicatively coupled 270, 272, 274 with each other: a cybersecurity application 250 running in the connected device 200, 204, a cybersecurity client 252 running in the CPE, 230, 232, and a cybersecurity server 254 running on the computing resource 256. In order to implement the interception 104 and the determination 106, the DNS proxy server 243 on the connected device 200 may communicate with the cybersecurity application 200, the DNS proxy server 242 on the CPE 230 may communicate with the cybersecurity client 252, and/or the stand-alone DNS proxy server 241 may communicate 276 with the cybersecurity server 252.

Figure 6:
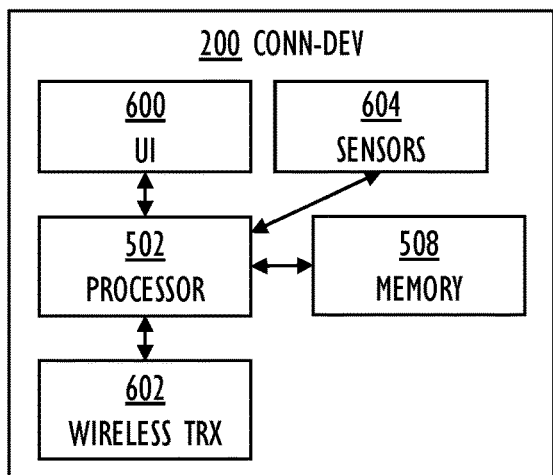
FIG. 6 is a block diagram illustrating an example of a connected device.

FIG. 6 illustrates an example of a connected device 200. As shown in FIG. 6, the connected device 200 comprises the one or more memories 508, and the one or more processors 502 coupled to the one or more memories 508 configured to implement functionality of the connected device, and possibly to carry out a part of the method/algorithm. In addition, the connected device 200 comprises a user interface 600 (such as a touch screen, or one or more light-emitting diodes (LEDs)), and one or more wireless transceivers (such as a WLAN transceiver, a cellular radio network transceiver, and a short-range radio transceiver) 602, and also one or more sensors 604. As shown in FIG. 2 and FIG. 4, the connected device 200, 200A, 200B, may be running a cybersecurity application 250, 250A, 250B.

Figure 7:
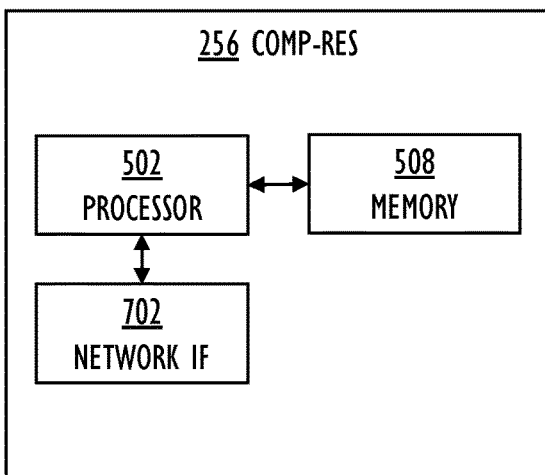
FIG. 7 is a block diagram illustrating an example of a computing resource.

FIG. 7 illustrates an example of the computing resource 256 such as a server apparatus. The server apparatus 256 may be a networked computer server, which interoperates with the connected device 200A, 200B and/or with the CPE 230 according to a client-server architecture, a cloud computing architecture, a peer-to-peer system, or another applicable distributed computing architecture. As shown in FIG. 7, the server apparatus 256 comprises the one or more memories 508, and the one or more processors 502 coupled to the one or more memories 508 configured to carry out a part of the method/algorithm. In addition, the server apparatus 256 comprises a network interface (such as an Ethernet network interface card) 702 configured to couple the server apparatus 256 to the Internet 410. As shown in FIG. 4, the computing resource 256 may be running the cybersecurity application 254, such as a cybersecurity server application 254.

Figure 8A:
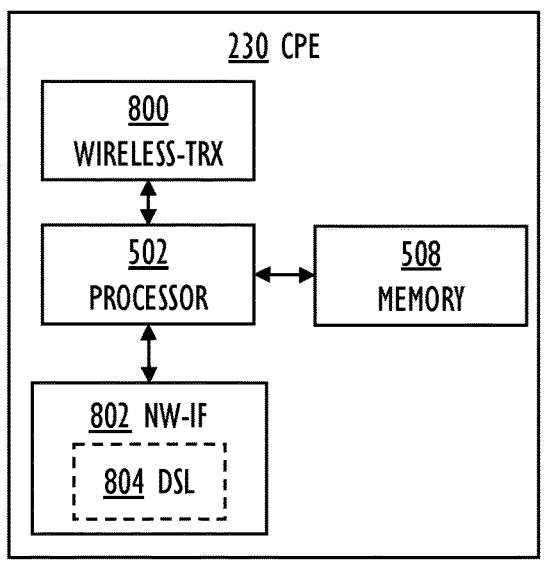
FIG. 8A and FIG. 8B are block diagrams illustrating examples of a customer-premises equipment.
Figure 8B:
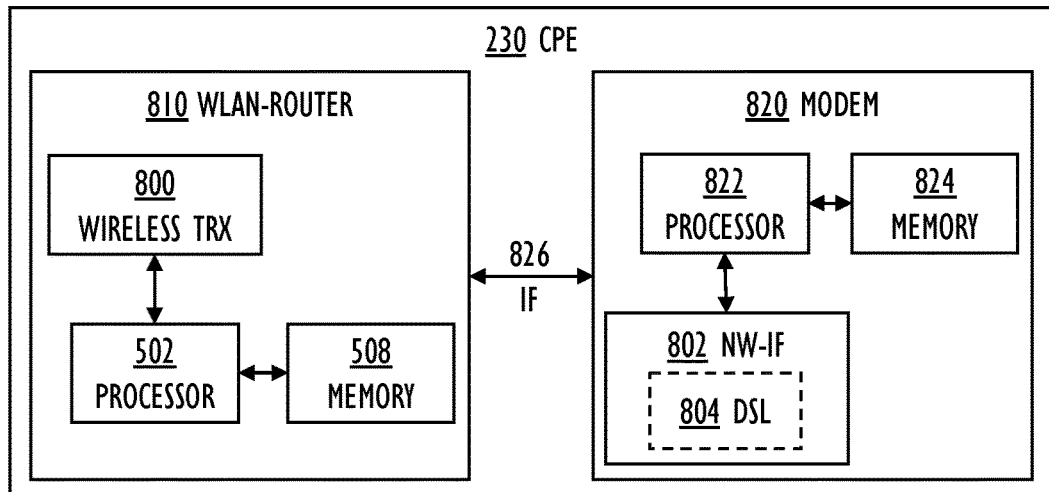

FIG. 8A and FIG. 8B illustrate examples of the CPE 230.

In FIG. 8A, the CPE 230 is an integrated apparatus comprising the one or more memories 508, and the one or more processors 502 coupled to the one or more memories 508 configured to carry out a part of the method/algorithm or the complete method/algorithm. Additionally, the CPE 230 comprises a wireless radio transceiver 800 configured to create the WLAN 402 for enabling access by the connected device 200A. The CPE 230 also comprises a network interface 802 to act as a modem configured to connect to the telecommunication circuit of the carrier at the demarcation point. The network interface 802 may operate as a Digital Subscriber Line (DSL) modem 804 using different variants such as Very high bitrate DSL (VDSL), Symmetric DSL (SDSL), or Asymmetric DSL (ADSL). As shown in FIG. 4, the CPE 230 may be running the cybersecurity application 252, such as a cybersecurity client application 252.

In FIG. 8B, the CPE 230 is a two-part apparatus. A WLAN router part 810 comprises the one or more memories 508, the one or more processors 502 coupled to the one or more memories 508 configured to carry out the method/algorithm, and the wireless transceiver 800 to create the WLAN 402 for enabling access by the connected device 200A. A modem part 820 comprises one or more processors 822 coupled to one or more memories 824 configured to carry out modem operations, and the network interface 802 to act as the modem configured to connect to the telecommunication circuit of the carrier at the demarcation point. The WLAN router part 810 may be purchased by the user of the connected device 200A to gain access to the method/algorithm, whereas the modem part 820 may be provided by carrier providing the telecommunication circuit access. As shown in FIG. 8B, the WLAN router part 810 and the modem part 820 may be communicatively coupled by an interface 826 (such as a wired Ethernet interface).

As illustrated in FIG. 4, the functionality of the apparatus 500, including the capability to carry out the method/algorithm, may be implemented in a centralized fashion by a stand-alone single physical unit, or alternatively in a distributed fashion using more than one communicatively coupled physical units.

These physical units comprise one or more of the connected device 200, 204, the connected device 200A at the home or office 400 running the cybersecurity application 250A with a home or office functionality, the connected device 200B on the move 420 running a cybersecurity application 250B with an on the move functionality, the CPE 230 running the cybersecurity client application 252, and the computing resource 256 running the cybersecurity server application 254. The method/algorithm operations may be implemented by one or more of these apparatuses 200A/200B/230/256 executing the cybersecurity applications 250A/250B/252/254.

As can be understood by the person skilled in the art, the method/algorithm operations may be distributed among the distributed software comprising the cybersecurity application 250A, 250B, the cybersecurity client application 252, and the cybersecurity server application 254 in numerous different configurations. In a first example, the cybersecurity application with the home functionality 250A communicates with the cybersecurity client application 252 and/or the cybersecurity server application 254 to implement the method/algorithm functionality. In a second example, the cybersecurity client application 252 communicates with the cybersecurity server application 254 to implement the method/algorithm functionality. In a third example, the cybersecurity application with the on the move functionality 250B communicates with the cybersecurity server application 254 to implement the method/algorithm functionality.

Thus, the cybersecurity application 250, 250A, 250B may comprise a stand-alone functionality to carry out the method/algorithm, or a part of the functionality, augmented by functionality of the cybersecurity client application 252 and/or by a functionality of the cybersecurity server application 254. Alternatively, the cybersecurity client application 252 may comprise a stand-alone fashion to carry out the method/algorithm, or a part of the functionality augmented by the functionality of the cybersecurity server application 254. As an additional alternative, the cybersecurity server application 254 may comprise a stand-alone fashion to carry out the method/algorithm. The cybersecurity application 250, 250A, 250B, and/or the cybersecurity client application 252 may operate as a frontend with a relatively limited resources as regards to the processor and memory, whereas the cybersecurity server application 254 may operate as a backend with a relatively unlimited resources as regards to the processor and memory, and the capability to serve a very large number of the connected devices 200, 204, 200A, 200B simultaneously.

Even though the invention has been described with reference to one or more examples according to the accompanying drawings, it is clear that the invention is not restricted thereto but can be modified in several ways within the scope of the appended claims. All words and expressions should be interpreted broadly, and they are intended to illustrate, not to restrict, the examples. As technology advances, the inventive concept defined by the claims can be implemented in various ways.

What is claimed is:

1. A computer-implemented method comprising:
intercepting a first data communication of a first connected device related to a first target website, wherein the first data communication identifies the first target website by a first fully qualified domain name (FQDN), and the first FQDN is mapped to a first Internet protocol (IP) address;
determining a pair of the first FQDN and the first IP address;
intercepting a second data communication of a second connected device related to a second target website, wherein the second data communication comprises a second encrypted FQDN of the second target website, and a second IP address of the second target website;
determining that the second IP address is equal to the first IP address of the pair;
retrieving a cybersecurity reputation of the second target website based on the first FQDN of the pair; and
in response to determining that the cybersecurity reputation of the second target website matches a predetermined alarm condition, enforcing a cybersecurity operation for the second data communication.

2. The method of claim 1, further comprising:
repeating intercepting the first data communication of the first connected device related to the first target website, and determining the pair of the first FQDN and the first IP address in order to obtain a plurality of pairs based on a plurality of first data communications by a plurality of first connected devices related to a plurality of first target websites.

3. The method of claim 1, wherein intercepting the first data communication of the first connected device related to the first target website further comprises:
intercepting, by a domain name system (DNS) proxy server, encrypted DNS query and response messages related to the first target website; and
obtaining, by the DNS proxy server, the first FQDN from an encrypted FQDN in the encrypted DNS query and response messages, and the first IP address from the encrypted DNS query and response messages.

4. The method of claim 3, wherein the encrypted DNS query and response messages use a transmission control protocol (TCP) or user datagram protocol (UDP) port number 53, or a TCP or UDP port number 853.

5. The method of claim 3, wherein the encrypted DNS query and response messages use a DNS over hypertext transfer protocol secure (DoH) protocol.

6. The method of claim 3, wherein the encrypted DNS query and response messages use a DNS over transport layer security (DoT) protocol.

7. The method of claim 3, wherein the encrypted DNS query and response messages use an encrypted client hello (ECH) extension of a transport layer security (TLS) protocol.

8. The method of claim 1, wherein intercepting the first data communication of the first connected device related to the first target website further comprises:
intercepting, by a customer-premises equipment (CPE), which implements a local area network for the first data communication of the first connected device, hypertext transfer protocol (HTTP) request and response messages in a transmission control protocol (TCP) connection; and
obtaining, by the CPE, the first FQDN from a host header in the HTTP request and response messages, and the first IP address from the TCP connection.

9. The method of claim 8, wherein the HTTP request and response messages use a TCP or UDP port number 80.

10. The method of claim 1, wherein intercepting the first data communication of the first connected device related to the first target website further comprises:
intercepting, by a customer-premises equipment (CPE), which implements a local area network for the first data communication of the first connected device, hypertext transfer protocol secure (HTTPS) request and response messages in a transmission control protocol (TCP) or user datagram protocol (UDP) connection; and
obtaining, by the CPE, the first FQDN from an unencrypted server name indication (SNI) in the HTTPS request and response messages, and the first IP address from the TCP or UDP connection.

11. The method of claim 10, wherein the HTTPS request and response messages use a TCP or UDP port number 443.

12. The method of claim 1, wherein the second data communication comprises the second encrypted FQDN in encrypted domain name system (DNS) query and response messages related to the second target website.

13. The method of claim 12, wherein the encrypted DNS query and response messages use a DNS over hypertext transfer protocol secure (DoH) protocol.

14. The method of claim 12, wherein the encrypted DNS query and response messages use a DNS over transport layer security (DoT) protocol.

15. The method of claim 12, wherein the encrypted DNS query and response messages use an encrypted client hello (ECH) extension of a transport layer security (TLS) protocol.

16. The method of claim 1, wherein intercepting the second data communication of the second connected device related to the second target website further comprises:
intercepting, by a customer-premises equipment (CPE), which implements a local area network for the second data communication of the second connected device, hypertext transfer protocol (HTTP), or HTTP secure (HTTPS) request and response messages in a transmission control protocol (TCP) or user datagram protocol (UDP) connection; and
obtaining, by the CPE, the second IP address from the TCP or UDP connection.

17. The method of claim 1, wherein enforcing the cybersecurity operation for the second data communication of the second connected device related to the second target website further comprises:
blocking the second data communication of the second connected device related to the second target website.

18. An apparatus comprising:
one or more memories; and
one or more processors coupled to the one or more memories configured to:
intercept a first data communication of a first connected device related to a first target website, wherein the first data communication identifies the first target website by a first fully qualified domain name (FQDN), and the first FQDN is mapped to a first Internet protocol (IP) address;
determine a pair of the first FQDN and the first IP address;
intercept a second data communication of a second connected device related to a second target website, wherein the second data communication comprises a second encrypted FQDN of the second target website, and a second IP address of the second target website;
determine that the second IP address is equal to the first IP address of the pair;
retrieve a cybersecurity reputation of the second target website based on the first FQDN of the pair; and
in response to determining that the cybersecurity reputation of the second target website matches a predetermined alarm condition, enforce a cybersecurity operation for the second data communication.

19. The apparatus of claim 18, wherein the one or more processors coupled to the one or more memories are further configured to:
repeat intercepting the first data communication of the first connected device related to the first target website, and determining the pair of the first FQDN and the first IP address in order to obtain a plurality of pairs based on a plurality of first data communications by a plurality of first connected devices related to a plurality of first target websites.

20. A non-transitory computer-readable medium comprising a computer program with instructions which, when executed by an apparatus, cause the apparatus to:
intercept a first data communication of a first connected device related to a first target website, wherein the first data communication identifies the first target website by a first fully qualified domain name (FQDN), and the first FQDN is mapped to a first Internet protocol (IP) address;
determine a pair of the first FQDN and the first IP address;
intercept a second data communication of a second connected device related to a second target website, wherein the second data communication comprises a second encrypted FQDN of the second target website, and a second IP address of the second target website;
determine that the second IP address is equal to the first IP address of the pair;
retrieve a cybersecurity reputation of the second target website based on the first FQDN of the pair; and
in response to determining that the cybersecurity reputation of the second target website matches a predetermined alarm condition, enforce a cybersecurity operation for the second data communication.

\* \* \* \* \*